United States Patent
Yoon et al.

(10) Patent No.: US 7,536,195 B2
(45) Date of Patent: May 19, 2009

(54) METHOD FOR PTT SERVICE IN THE PUSH TO TALK PORTABLE TERMINAL

(75) Inventors: Sung-Jae Yoon, Gumi-si (KR); Dong-Han Kang, Dacgu (KR); Jae-Gwan Shin, Dacgu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 11/194,603

(22) Filed: Aug. 2, 2005

(65) Prior Publication Data
US 2006/0035659 A1 Feb. 16, 2006

(30) Foreign Application Priority Data
Aug. 10, 2004 (KR) ............... 10-2004-0062929

(51) Int. Cl.
*H04B 7/00* (2006.01)
(52) U.S. Cl. ........................... 455/518; 455/407
(58) Field of Classification Search ............. 455/518, 455/566, 412.1, 415
See application file for complete search history.

(56) References Cited

U.S. PATENT DOCUMENTS
6,522,894 B1 2/2003 Schmidt
2004/0266468 A1* 12/2004 Brown et al. ............ 455/518
2006/0286971 A1* 12/2006 Maly et al. ............... 455/415

FOREIGN PATENT DOCUMENTS
CN 1638503 A 7/2005
EP 1 113 661 7/2001
WO WO 01/37526 5/2001

* cited by examiner

*Primary Examiner*—Tu X Nguyen
(74) *Attorney, Agent, or Firm*—Roylance, Abrams, Berdo & Goodman, L.L.P.

(57) ABSTRACT

A method for performing a push to talk (PTT) communication service in a portable terminal. The method comprises entering a PTT communication mode and providing a PTT application, when a function key and an abbreviated number key for performing the PTT communication service are input to the portable terminal and performing the PTT communication service based on subscriber information of the PTT communication service corresponding to the input abbreviated numbers. Several steps of key inputs and menu selections can be removed because, the method requires only a few abbreviated number for reflecting all the necessary steps stored previously in the memory such that it can provide an improved convenience and simplicity of the operation for the PTT communication service to the users.

5 Claims, 4 Drawing Sheets

METHOD FOR PTT SERVICE IN THE PUSH TO TALK PORTABLE TERMINAL

CROSS-REFERENCE TO RELATED APPLICATION

This application claims the benefit under 35 U.S.C. § 119(a) of Korean Patent Application entitled "METHOD FOR PTT SERVICE IN THE PUSH TO TALK PORTABLE TERMINAL" filed in the Korean Industrial Property Office on Aug. 10, 2004 and assigned Serial No. 2004-62929, the entire contents of which are hereby incorporated by reference.

BACKGROUND OF THE INVENTION

1. Field of the Invention

The present invention relates to a portable terminal. More particularly, the present invention relates to a method for providing a push to talk (PTT) communication service using abbreviated numbers.

2. Description of the Related Art

Typically, a conventional wireless communication system for the portable terminals has a plurality of small unit areas or cells divided or distributed in the whole service coverage area. Each of the cells has a base station (BS) located therein such that the corresponding BS can cover its corresponding cell. All the base stations are centrally controlled by a mobile switching center (MSC) so that subscribers may maintain their calls in the coverage area when moving between cells.

According to advancements in communication technologies, several solutions are provided for combining an internet protocol (IP) network with a wireless communication network for portable terminals. One such solution is, for example, voice over IP (VoIP) which provides a voice service based on packets using IP.

A conventional call service based on these packets has a defect because call establishment time is relatively greater in order to establish the call through both the wireless communication network and the IP network. In order to overcome such a defect, the conventional call service system provides an interactive call service such as a group call and a private call by using a multicast function of IP network. The interactive call service is a type of call in which traffic comprises inter-actions between a plurality of users. Such a call has, for example, a function of push to talk (PTT) as in a Walkie-Talkie. The group call mentioned above provides a conference call between some users selected among the predetermined users group, and the private call provides a one-to-one call between the users selected among the predetermined users group.

Such a PTT communication service is capable of providing voice and data services to a plurality of users or users group such that the users can express their own intentions or what they want to say by pressing predetermined buttons for PTT communication while the users' terminals or the portable terminals capable of performing the PTT communication service transmit service requests to the related network. Then, the network rejects the service requests or accepts the service requests and assigns the requested resources to the corresponding users based on predetermined determination criteria such as the availability of the existing resources thereof and priorities of the, requesting users, which have sent the service requests. At the same time, the requesting users are connected with all the other active users which belong to a specific subscriber group by establishing the connection in the network system. Accordingly, the requesting users can talk with the other parties who then hear from the requesting users on the corresponding channel if a voice connection is established. If the users want to release the request of the PTT communication service, the corresponding portable terminals send the network release messages to the network to release assignment of the resources provided to the users. Such a conventional PTT communication system can provide a point-to-point communication service as well as a point-to-plural-points communication service.

The PTT portable terminal, however, needs several steps to perform PTT communication service. Specifically, if the user selects some menu corresponding to PTT communication service mode, or the user inputs some mode keys of PTT communication service on the portable terminal, the user receives a list of subscribers of the PTT communication service which belong to a specific group (hereinafter, the subscriber will be referred to as "buddy") from the network. Then, the user retrieves and searches the received buddy list, selects a certain buddy or buddies to whom the user wants to be connected, and executes the desired PTT communication. Therefore, several steps for key inputs and menu selections are required to establish a PTT communication service in the PTT portable terminals, which cause inefficient use of time and tediousness in operating of the PTT terminal.

SUMMARY OF THE INVENTION

Accordingly, the purpose of the present invention is to solve the above-mentioned problems occurring in the prior art. An object of the present invention is to provide a method for executing or operating a push to talk (PTT) communication service in which only a few key input operations are required.

In order to achieve this object, according to an aspect of the present invention, a method for performing a PTT communication service in the portable terminal capable of providing the PTT communication service is provided. The method comprises the steps of entering a PTT communication mode and driving a PTT application, when a function key and an abbreviated number for performing the PTT communication service are input to the portable terminal, and performing the PTT communication service based on subscriber information of the PTT communication service corresponding to the input abbreviated number.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Hereinafter, exemplary embodiments of the present invention will be described with reference to the accompanying drawings. A detailed description of known functions and configurations incorporated herein will be omitted for clarity and conciseness. Further, various terminologies found in the following description may be changed according to a practice or an intent which a user or an operator using those words may have, and are provided only to help general understanding of the present invention. Therefore, the definitions of the terminologies used herein should be understood based on the general purpose or description of the specification, and it is apparent to those skilled in the art that the present invention can be implemented without such definitions.

Figure 1:
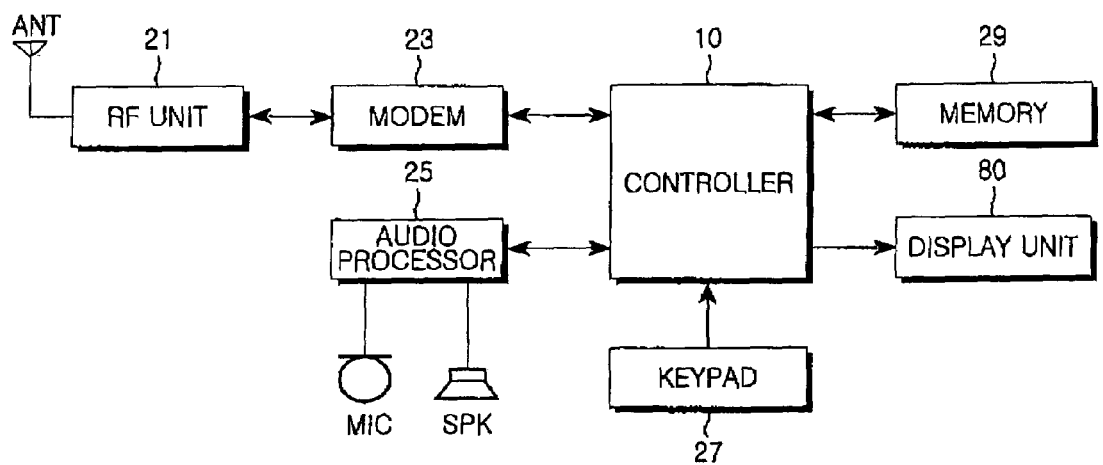
FIG. 1 is a block diagram illustrating a structure of a push to talk (PTT) portable terminal according to an exemplary embodiment of the present invention.

FIG. 1 is a block diagram illustrating a structure of a push to talk (PTT) portable terminal according to an exemplary embodiment of the present invention. Referring to FIG. 1, a radio frequency (RF) unit 21 performs communication functions of the portable terminal. The RF unit 21 comprises a RF transmitter (not shown) for up-converting the frequencies of transmitted signals and amplifying the transmitted signals and a RF receiver (not shown) for low-noise-amplifying received signals and down-converting the frequencies thereof.

A modem 23 comprises a transmitter (not shown) for coding and modulating the received signals and a receiver (not shown) for demodulating and decoding the received signals. Specifically, the modem 23 processes packet data and the like, and processes audio signals such as voices.

An audio processor 25 comprises a data codec (not shown) for processing packet data and an audio codec (not shown) for processing audio signals. By using the audio codec, the audio processor 25 converts the digital audio signals received from the modem 23 into analog signals to be reproduced, or converts analog audio signals generated in and transmitted from a microphone (MIC), into digital audio signals to transmit the converted digital audio signals to the modem 23. The codecs can be separate elements or be included in controller 10. If the received signals are input to the codec via the modem 23 and the controller 10, the audio processor 25 converts the received signals into audible sounds via a speaker (SPK) and output to the outside from the speaker. Also, the audio processor 25 receives the audio signals from the microphone (MIC) and digitizes the received audio signals to send them to the controller 10.

A keypad 27 comprises a plurality of keys for inputting numeric information or character information and function keys for establishing various functions. The keypad 27 may further comprise some function keys for push to talk (PTT) communication services according to an exemplary embodiment of the present invention. For example, the keypad 27 may comprise some function keys capable of establishing or releasing the PTT communication service mode by using a one-time-key input, or a function key for inputting abbreviated numbers.

Referring to FIG. 1, a memory 29 comprises a program memory (not shown) and a data memory (not shown). The program memory stores therein certain programs for controlling general operation of the PTT portable terminal, and the data memory temporally stores therein certain data generated when executing the programs. Also, the program memory may store a program for matching a buddy with corresponding phone numbers having the same information, and a program for displaying input windows for allowing the users to input the abbreviated numbers on the PTT communication service mode. Further, the data memory may store phone number information in the form of phone number tables like phone books, with the abbreviated numbers set corresponding to the phone numbers.

The controller 10 has a function for controlling the whole operation of the PTT portable terminal. According to an exemplary embodiment of the present invention, the controller 10 receives a buddy list when driving a PTT application, and compares the received buddy list with a phone number list stored in the phone number table such as the phone book. Then, if new buddy information is found in the buddy list based on the results of the comparison, the controller 10 updates the phone number list. Also, the controller 10 matches a part of the updated phone number list with a part of the buddy list if both parts thereof have the same information. Further, if any abbreviated number is input to the abbreviated number input window, the controller 10 reads the phone number corresponding to the input abbreviated number, and performs the PTT communication using the buddy matched to the read phone number. The controller 10 may comprises the modem 23 therein.

Referring to FIG. 1, the controller 10 controls a display unit 80 to display thereon any messages generated when executing the programs. According to an exemplary embodiment of the present invention, the display unit 80 displays buddy information of a received specific group, and the abbreviated number input window when the user wants to input the abbreviated number. The display unit 80 is a liquid crystal display (LCD) or the like which is suitable to display. In this case, the display unit 80 may comprise an LCD controller, a memory for storing image data, and an LCD display device. In case that the LCD of the display unit 80 is structured in the form of a touch screen, the keypad 27 and the LCD may be an input unit.

Operation of the PTT portable terminal will be described hereinafter. If the user performs a dialing operation through the keypad 27 to establish an outgoing mode for sending outgoing signals, the controller 10 monitors the established outgoing mode and directs the modem 23 to process the received dialing information. Then, the RF unit 21 converts the processed dialed information to RF signals to be output. Next, if a called subscriber sends a response signal to the outgoing signals, the controller 10 monitors the response signal via the RF unit 21 and the modem 23. Then, the user can perform the communication operation through the audio processor 25 for which a voice communication path has been already prepared. Also, in the case of an incoming mode, the controller 10 monitors just the incoming mode and directs the audio processor 25 to generate a ring signal. If the user responds to the ring signal, the controller 10 monitors this user's response and directs the audio processor 25 to make a voice communication path through which then the user can communicate with her or his called party. Although only the exemplary voice communications are described for both the outgoing and the incoming modes as mentioned above, in addition to the voice communication, the PTT portable terminal of an exemplary embodiment of the present invention can further provide the packet data communication function and the image data communication function. Also, when operating in a standby mode and a character communication mode, the controller 10 directs the display unit 80 to display thereon the character data processed by the modem 23.

Such a PTT portable terminal performs the operation of the PTT communication service as follows. First, if the user who wants the PTT service inputs a PTT communication service mode key and an abbreviated number corresponding to the PTT communication service, the controller 10 drives a PTT application to receive the buddy list. Also, the controller 10 compares the received buddy list with the phone numbers stored in the phone number table such as the phone book to match a part of the phone numbers with a part of the buddy list if both parts thereof have the same information. Further, the controller 10 reads a certain phone number corresponding to the input abbreviated number from the memory 29, and forms a call for the PTT communication service based on a certain buddy matched with the phone number.

Figure 2:
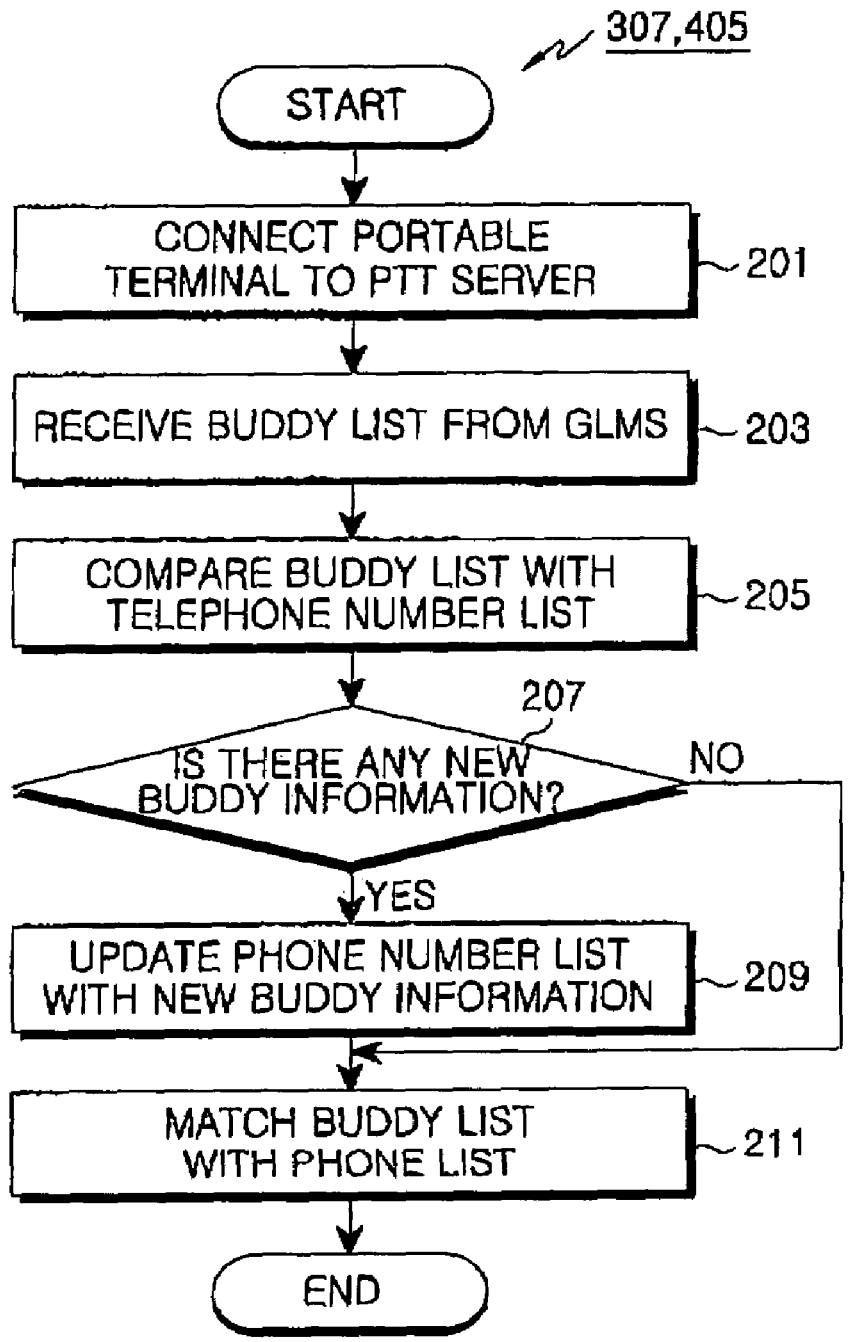
FIG. 2 is a flow chart illustrating a driving process of a PTT application in the PTT portable terminal according to an exemplary embodiment of the present invention.

FIG. 2 is a flow chart illustrating a driving process of a PTT application in the PTT portable terminal according to an exemplary embodiment of the present invention.

Referring to the FIG. 2, when the PTT communication service mode key is input to the PTT portable terminal, at step 201 the controller 10 controls the RF unit 21 and the modem 23 to transmit a signal to a PTT server so that the PTT portable terminal may be connected to the PTT server. At step 203, the PTT portable terminal receives a buddy list from a group and list management server (GLMS). At step 205, the controller 10 reads, from the memory 29, a phone number list stored in the phone number table such as the phone book to compare the phone number list with the received buddy list. At step 207, the controller 10 determines if there is any new buddy information which is not in the phone number table. If there is new buddy information, at step 209 the controller 10 updates the phone number list with the new buddy information. Next, at step 211, the controller 10 matches the updated phone number list with the part of the whole buddy list which has the same information as those of the updated phone number list.

At step 207, however, if there is no new buddy information, the process proceeds to the step 211 wherein the controller 10 matches the existing phone number list with the part of the whole buddy list which has the same information as those of the existing phone number list.

Figure 3:
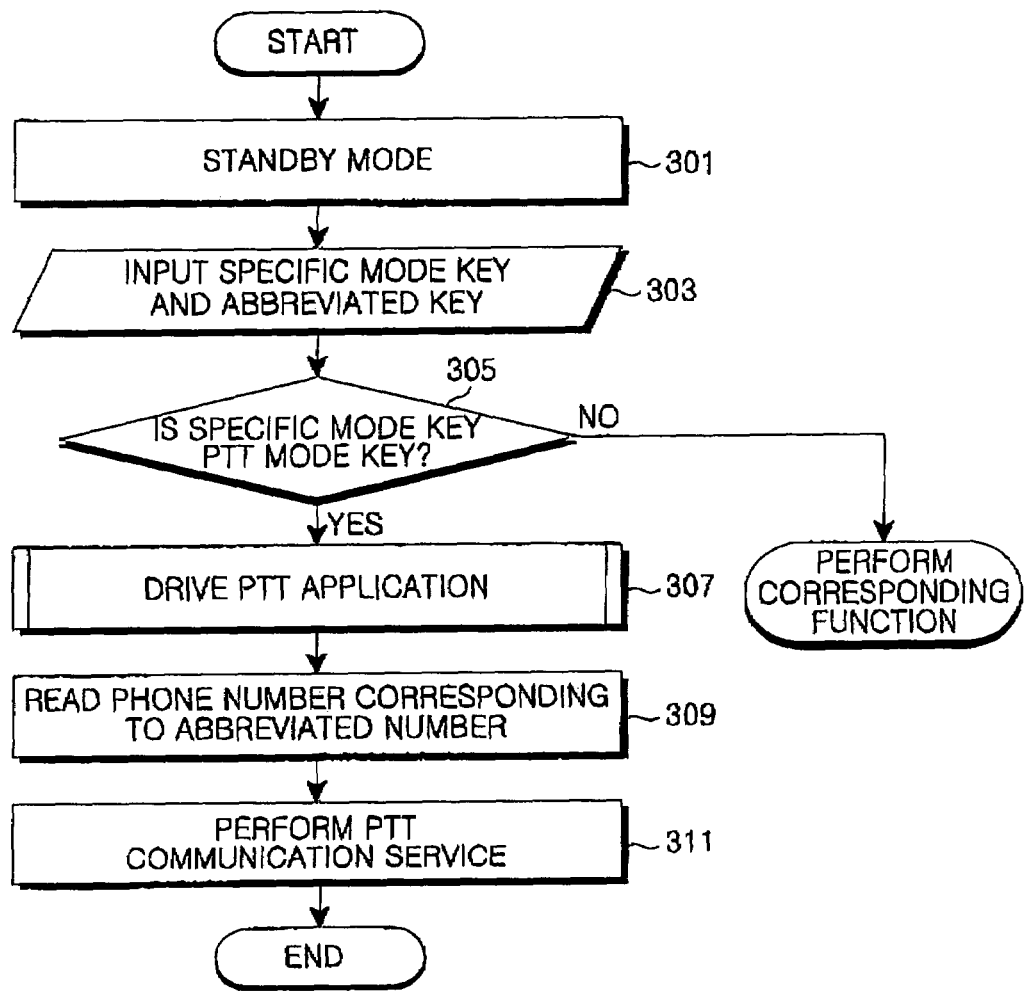
FIG. 3 is a flow chart illustrating an operation process of a PTT communication service in the PTT portable terminal according to an exemplary embodiment of the present invention.

FIG. 3 is a flow chart illustrating an operation process of a PTT communication service in the PTT portable terminal according to an exemplary embodiment of the present invention.

Referring to the FIG. 3, if the process proceeds from a standby mode of step 301 to step 303 wherein when the user who wants the PTT communication service inputs a predetermined mode key for establishing the PTT communication service mode through the keypad 27, and also inputs an abbreviated number on the keypad 27 for forming a PTT communication service call, then the controller 10 monitors that input information. The specific mode key comprises, for example, a side key, a * key, a # key and the like. Next, the process proceeds to step 305 wherein the controller 10 determines if the specific mode key is the PTT communication mode key. If it is not the PTT communication mode key, then the controller 10 executes a function corresponding to the specific mode key. If the specific mode key is just the PTT communication mode key, at step 307, the controller 10 drives a PTT application. Specifically, in providing the PTT application related with FIG. 2, if the controller 10 transmits a signal for connecting the PTT portable terminal to the PTT server, the GLMS transmits the buddy list to the controller 10. Then, the controller 10 compares the received buddy list with a phone number list stored in the phone number table such as the phone book, and matches the phone number list with the part of the received whole buddy list which have the same information as those of the phone number list.

Next, at step 309, the controller 10 controls the memory and reads, from the memory 29, a certain phone number corresponding to the input abbreviated number. Further, the process proceeds to step 311, whereby the controller tries to perform the PTT communication service with the buddy matched to the phone number. Accordingly, the PTT portable terminal can be connected with the buddy group matched to the phone number corresponding to the abbreviated number by the PTT communication service. Specifically, if the user of the PTT portable terminal who wants the PTT service inputs, for example, * key or # key for establishing the PTT communication service mode key and an abbreviated number corresponded thereto, the controller 10 drives a PTT application to receive the buddy list. Also, the controller 10 compares the received buddy list with the phone numbers stored in the phone number table such as the phone book to match a part of the phone numbers with a part of the buddy list if both parts thereof have the same information. Accordingly, the controller 10 performs the operation of the PTT communication service with the buddy matched to the phone number corresponding to the input abbreviated number.

Figure 4:
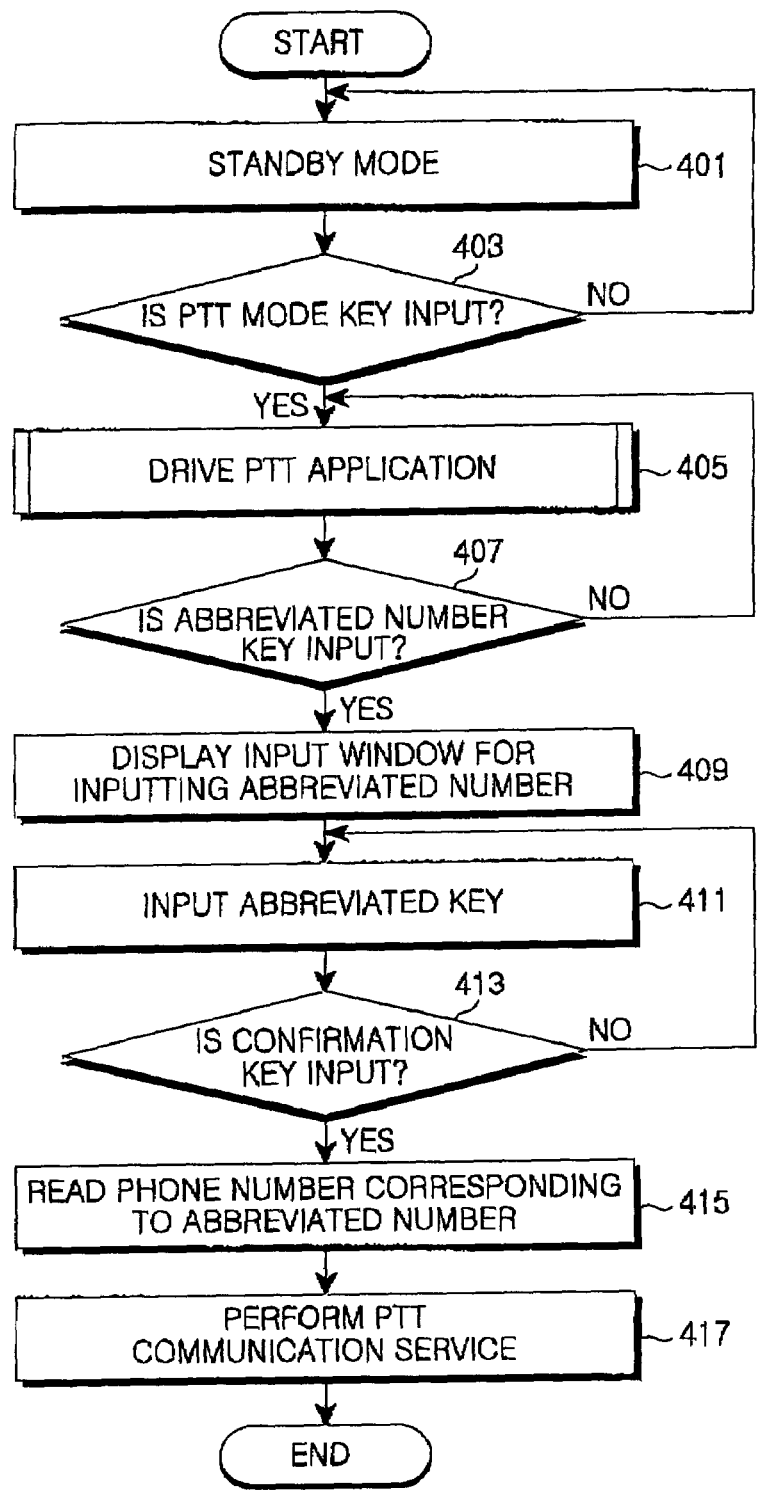
FIG. 4 is a flow chart illustrating an operation process of a PTT communication service in the PTT portable terminal according to another exemplary embodiment of the present invention.

FIG. 4 is a flow chart illustrating an operation process of a PTT communication service in the PTT portable terminal according to an exemplary embodiment of the present invention.

Referring to the FIG. 4, if the process proceeds from a standby mode of step 401 to step 403 wherein, when the user who wants PTT communication service inputs the PTT communication service mode key through the keypad 27, the controller 10 monitors that input information. The PTT communication service mode key comprises, for example, a side key, a * key or a # key. Next, the process proceeds to step 405 wherein the controller 10 drives a PTT application to perform the PTT communication service. Specifically, in the driving of the PTT application related with FIG. 2, if the controller 10 transmits a signal for connecting the PTT portable terminal to the PTT server, the GLMS transmits the buddy list to the controller 10. Then, the controller 10 compares the received buddy list with a phone number list stored in the phone number table such as the phone book, and matches the phone number list with the part of the received whole buddy list which have the same information as those of the phone number list Then, if the user of the PTT portable terminal inputs an abbreviated number for the PTT communication with the other buddy, the process proceeds to the step 409 wherein the controller 10 controls the memory 29 and the display unit 80 to display the input window for inputting the abbreviated number. Next, in step 413, if the user of the PTT portable terminal inputs the abbreviated number and confirmation key, then the controller 10 monitors the input key information, and determines if the confirmation key is input at step 413. If yes, at step 415, the controller 10 controls the memory 29 and reads, from the memory 29, a certain phone number corresponding to the input abbreviated number. Further, the process proceeds to the step 417, wherein the controller tries to perform the PTT communication service with the buddy matched to the read phone number. Accordingly, the PTT portable terminal can be connected with the buddy group matched to the phone number corresponding to the abbreviated number by the PTT communication service. Specifically, if the user of the PTT portable terminal who wants the PTT service inputs, for example, a * key or a # key for establishing the PTT communication service mode key, the controller 10 drives a PTT application to receive the buddy list. Also, the controller 10 compares the received buddy list with the phone numbers stored in the phone number table such as the phone book to match a part of the phone numbers with a part of the buddy list if both parts thereof have the same information. Next, if the user inputs the abbreviated number, the input window of the abbreviated number is displayed. Then, if the user inputs the desired abbreviated number on the input window, the controller 10 performs the operation of the PTT communication service with the buddy matched to the phone number corresponding to the input abbreviated number.

In the operation of the conventional PTT communication service, several steps of key inputs and several steps of menu selections are essentially required. However, according to the exemplary embodiments of the present invention, said several steps of key inputs and menu selections can be removed because, for the PTT communication service, the exemplary embodiments of the present invention requires only a few abbreviated numbers for reflecting all the necessary steps stored previously in the memory. Accordingly the present invention can provide the improved convenience and simplicity of the operation for the PTT communication service to the users.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for performing a push to talk (PTT) communication service in a portable terminal, the method comprising the steps of:

connecting the portable terminal to a PTT server in order to perform PTT communication service, when a function key for performing the PTT communication service is input to the portable terminal;

receiving a subscriber list of the PTT communication service from the server;

comparing the received subscriber list with a phone number list stored in the phone number table;

matching, at the portable terminal, the phone numbers with subscriber information of the PTT communication service, the subscriber information being the same as that of the phone number;

reading a phone number corresponding to an input abbreviated number when the abbreviated number is input; and performing the PTT communication service based on subscriber information of the PTT communication service matched to the read phone number.

2. The method as claimed in claim 1, wherein the method further comprises the step of determining if the input function key is a key established for performing the PTT communication service.

3. The method as claimed in claim 1, wherein, the method further comprises:

outputting subscriber information matched to the read phone numbers.

4. The method as claimed in claim 1, wherein the step of comparing the received subscriber list with a phone number list stored in the phone number table, comprises the steps of:

determining if there is any new subscriber information of the PTT communication service which are not in the phone number list stored in the phone number table; and updating the phone number list with the new subscriber information of the PTT communication service, if there is any new subscriber information.

5. The method as claimed in claim 1, wherein the reading step further comprises:

displaying an input window for allowing the abbreviated number to be input thereto, when a key for inputting the abbreviated number is input; and reading the phone number corresponding to the input abbreviated number when the abbreviate number is input through the input window.

* * * * *